July 28, 1970  W. A. WISEMAN ET AL  3,521,607
ENGINE CYLINDER AND HEAD CONSTRUCTION
Filed July 24, 1969  2 Sheets-Sheet 2
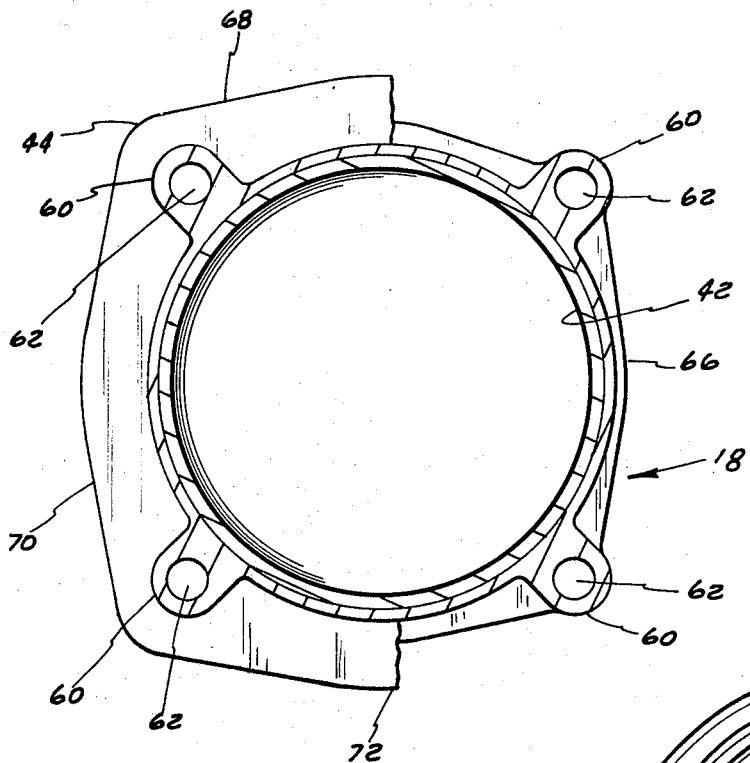
FIG·4
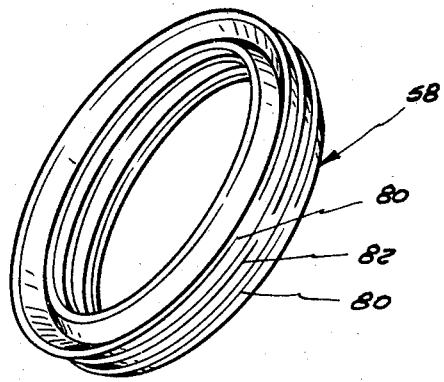
FIG·3A
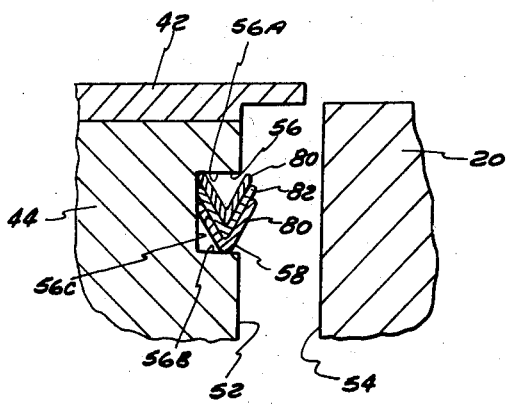
FIG·3
INVENTORS
WILLIAM A. WISEMAN
RAYMOND J. GREEN
BY
Hauke Gifford & Patalidis
Attorneys United States Patent Office 3,521,607
Patented July 28, 1970

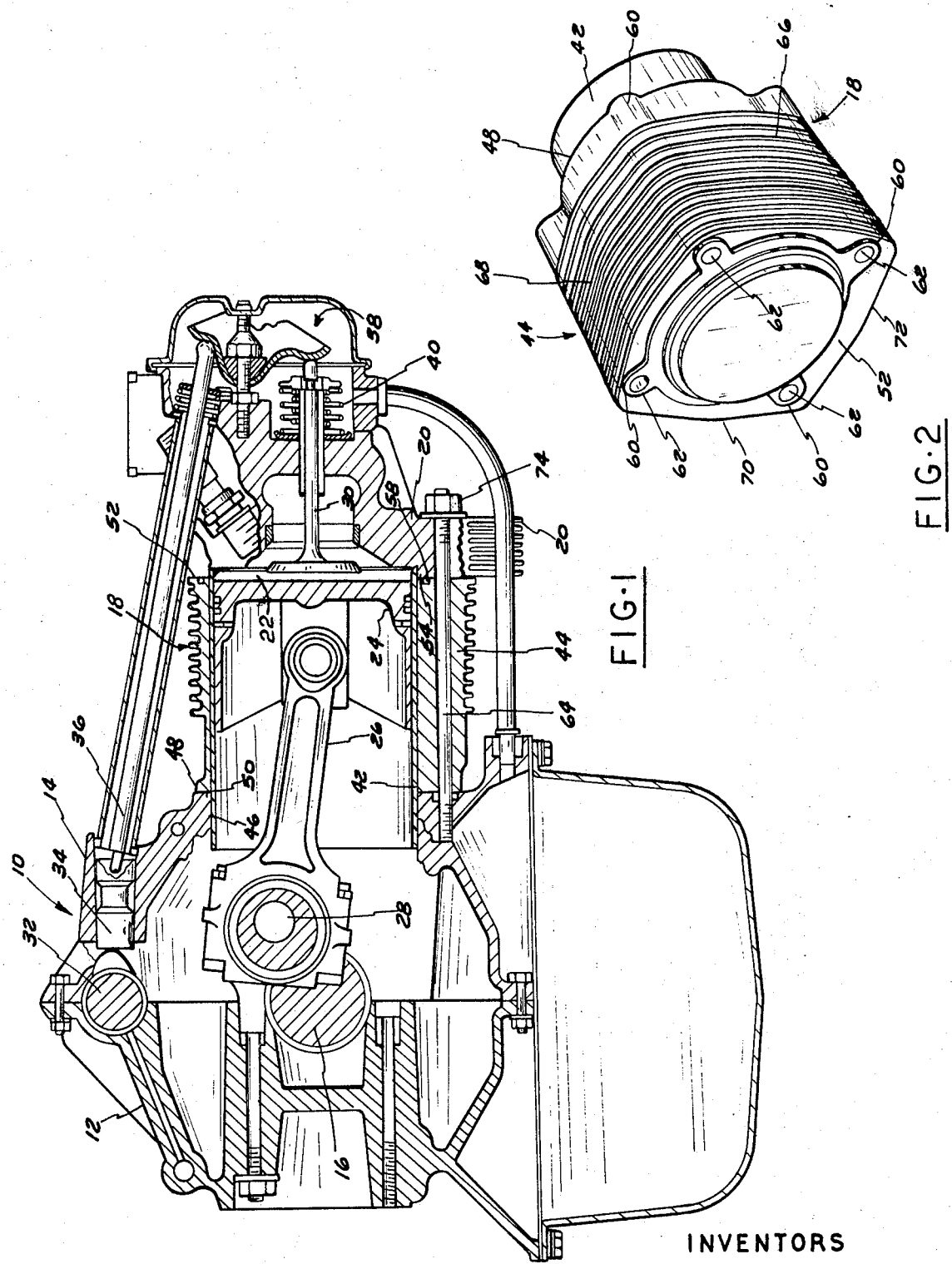

3,521,607
ENGINE CYLINDER AND HEAD CONSTRUCTION
William A. Wiseman and Raymond J. Green, Muskegon, Mich., assignors to Continental Motors Corporation, Detroit, Mich., a corporation of Virginia
Continuation-in-part of application Ser. No. 655,416, July 24, 1967. This application July 24, 1969, Ser. No. 844,466
Int. Cl. F02f 1/06; F01b 31/28; F16j 15/02
U.S. Cl. 123—41.69
9 Claims

ABSTRACT OF THE DISCLOSURE

A cylinder and head arrangement for an internal combustion engine with the cylinder barrel and the head being separably mounted to the crankcase by through bolts which clamp the cylinder barrel between the head and the crankcase. The mating surfaces between the cylinder head and the barrel are sealed by a compressible annular gasket seated in an annular recess formed in the cylinder barrel to eliminate the conventional gasket retaining ring while permitting a predetermined amount of gasket compression to achieve an adequate seal between the barrel and the head. The gasket is V-shaped in section is disposed in said recess with one of the legs engaging the bottom of the recess and the other engaging the cylinder head surface. The legs also have portions engaging the opposite surfaces of the recess so that when assembled the gasket is engaged with each surface of the recess as well as with the cylinder head.

CROSS REFERENCE TO RELATED APPLICATION

The present application is a continuation-in-part of application Ser. No. 655,416, filed July 24, 1967, and now abandoned.

BACKGROUND OF THE INVENTION

Field of the invention

This invention relates to internal combustion engines and more particularly to an improved cylinder barrel and head construction arranged for separable mounting to the crankcase of an air cooled engine.

Description of the prior art

Conventional engine cylinders for aircraft engines comprise a steel cylinder made from a forging which requires considerable machining to produce a barrel with a threaded end. The machining operations result in a waste of 60% to 70% of the original material. The threaded barrel is then shrunk and threaded into a cylinder head and the assembly is processed through a number of operations to finish the bore, the flange, the valve gear and so on. The head and the barrel normally have external fins for dissipating the heat generated within the cylinder. When the head and the cylinder are separate units, the joint between the head and the cylinder barrel requires an effective seal as such joints are subjected to high loads and thermal distortions during operating conditions and thus the seal is extremely important.

It is the broad purpose of the present invention to provide an improved cylinder barrel construction which substantially reduces the waste in the manufacturing process, has a finned muff with a novel configuration for dissipating the heat and a novel form of sealing means disposed within the joint defined between the cylinder head and the cylinder barrel.

SUMMARY

The preferred embodiment of the present invention, which will subsequently be described in greater detail, is described with reference to an air-cooled aircraft engine. The engine has a crankcase with an opening to accommodate a piston rod and is surrounded by a flat mounting surface for a cylinder barrel. The cylinder barrel is a two part assembly including a cast iron cylindrical sleeve and an externally finned cast aluminum muff which encompasses the sleeve. Both ends of the sleeve extend beyond the muff with one end of the sleeve normally being received in the crankcase opening while the opposite end is seated in the cylinder head. The opposite ends of the muff provide mounting surface with one end being seated on the crankcase and the other end providing a mounting surface for the cylinder head. The muff has four full length bosses to accommodate four mounting bolts so that the cylinder barrel can be easily and quickly removed for replacement purposes without having to replace the cylinder head as is conventional practice. The cast iron sleeve has a longer life than conventional steel liners.

The cylinder head is separably mounted on the cylinder barrel with the four through mounting bolts joining the cylinder head to the crankcase with the cylinder barrel being clamped between the two members.

The head mounting surface formed on the end of the muff has an annular recess formed around the sleeve with a depth less than the thickness of a compressible gasket which is disposed in the recess. The gasket is V-shaped in section having legs with portions engaging each surface of the recess so that when the head is mounted on the cylinder barrel, the legs are moved toward each other to compress the gasket and to provide an effective seal between the cylinder head and the cylinder barrel. This gasket mounting arrangement not only provides an effective seal but prolongs the life of the gasket so that a new gasket is not required each time that the head is disassembled.

The cooling fins on the muff are formed of aluminum and have a non-symmetrical configuration with those areas of the cylinder barrel exposed to higher temperatures having a greater cooling surface. Thus, the portions of the muff associated with the exhaust port of the combustion chamber have a greater number of fins each of which has a greater height to provide more heat dissipating surface than the portions of the muff disposed adjacent the intake port of the cylinder assembly.

The preferred cylinder barrel and cylinder head assembly not only provides a simpler design resulting in lower manufacturing costs as compared to conventional cylinder construction, but the cylinder barrel can be easily replaced in service. The novel gasket mounting arrangement provides an improved seal between the cylinder barrel and the cylinder head and the novel cooling fin configuration provides a greater heat dissipation for high speed engines than conventional fin configurations thereby resulting in an overall engine weight reduction as compared to a conventional engine of comparable horsepower.

DESCRIPTION OF THE DRAWINGS

The description refers to the accompanying drawings in which like reference characters refer to like parts throughout the several views and in which:

FIG. 1 is a transverse cross-sectional view through an air cooled aircraft engine having a cylinder barrel and cylinder head arrangement illustrating a preferred embodiment of the present invention;

FIG. 2 is a perspective view of the preferred cylinder barrel assembly separated from the remaining portions of the engine of FIG. 1;

FIG. 3 is an enlarged fragmentary view of the cylinder barrel and cylinder head separated one from the other to illustrate the gasket of the present invention in an uncompressed condition;

FIG. 3A is an elevational view of the gasket of the present invention; and

FIG. 4 is an enlarged transverse cross-sectional view of the cylinder barrel of FIG. 2 with parts broken away for purposes of description.

DESCRIPTION OF THE PREFERRED EMBODIMENT

Now referring to the drawings, FIG. 1 illustrates an aircraft engine 10 comprising a pair of crankcase halves 12 and 14 joined together to support a crankshaft 16. A cylinder barrel assembly 18 mounted on the crankcase half 14 and a cylinder head 20 joined to the barrel assembly 18 cooperate to form a combustion chamber 22. A piston 24 reciprocally mounted within the barrel assembly 18 is connected by a rod 26 to a crank pin 28 of the crankshaft 16 and imparts rotary motion to the crankshaft 16 as the piston 24 is driven in alternate directions.

Still referring to FIG. 1 an intake valve 30 mounted in the cylinder head 20 admits a combustible mixture into the combustion chamber 22 at timed intervals and an exhaust valve (not shown) discharges the products of combustion at the end of the power stroke of the piston 24. The movement of the intake valve 30 is controlled by a cam shaft 32 supported by the crankcase halves 12 and 14 and which reciprocates a tappet unit 34 engaged with a push rod 36 which actuates a rocker arm assembly 38 to open the valve 30. A spring 40 normally maintains the valve 30 in a seated position within the cylinder head 20.

As best seen in FIGS. 1 and 2 the cylinder barrel 18 is fabricated from a cast iron cylindrical sleeve 42 and an aluminum muff 44 which encompasses the sleeve 42. The opposite ends of the sleeve extend beyond the muff with one end being received through a circular bore 46 (FIG. 1) in the crankcase half 14 and the opposite end being seated in the cylinder head 20. The muff 44 has an annular flange portion 48 which provides a surface for mounting the cylinder barrel assembly 18 to a flat mounting surface 50 surrounding the opening 46. The opposite end of the muff 44 has a flat annular mounting surface 52 which is joined to a flat surface 54 of the cylinder head 20.

As can best be seen in FIG. 3 an annular recess 56 is provided in the mounting surface 52 around the sleeve 42. The recess 56 has a generally rectangular cross-section and a predetermined depth to accommodate an annular gasket 58. The gasket 58 is radially compressible and has an uncompressed thickness greater than the depth of the recess 56 so that when the head 20 is joined to the cylinder barrel 18 with the surfaces 52 and 54 in face to face relationship, the gasket 58 is compressed into the recess 56 to provide a sealed engagement between the head 20 and the cylinder barrel 18.

As can best be seen in FIG. 3A the gasket 58 is preferably of the chevron type consisting of a spirally wound elongated section of stainless steel 80 (FIG. 3) having a V-shaped cross-section and with a high temperature liner such as asbestos 82 between the windings. One set of legs formed by the V-shaped sections 80 and 82 extends between the sides 56A and 56B of recess 56 and engages the inner surface 56C of the recess 56 so that as the cylinder assembly 18 is bolted into place each surface of the recess 56 as well as the surface 54 is engaged by portions of the gasket 58 to thereby provide an effective seal between the surfaces 52 and 54.

The head 20 and the muff 44 are externally finned for purposes of heat dissipation. As best seen in FIG. 2, the muff 44 has four longitudinally extending bosses 60 extending the full length of the muff. Each boss 60 has a through bore 62 to accommodate a through mounting bolt 64. The bosses 60 divide the muff into four sides, 66, 68, 70 and 72. The side 66 which is mounted adjacent the intake valve 30 of the cylinder experiences lower temperatures than the opposite side 70 of the muff which is associated with the exhaust valve of the cylinder. The fin height on the side 70 is greater than on the side 66 in order to provide a greater heat dissipating area. For the same reason, there are fewer rows of fins associated with the sides 66 than with the side 70. As can be seen in both FIGS. 1 and 2, the height of the fins is greatest adjacent the head 20 and gradually tapers toward the crankcase in order to accommodate the greater temperatures experienced by the cylinder at the top of the combustion chamber 22.

As can be seen in FIG. 2, the sleeve 42 and the muff 44 are joined together to form a replaceable cylinder barrel assembly. The muff 44 is preferably die casted on the cast iron sleeve 42 to produce a simplified design lending itself to modern finning techniques. The through bolts 64 each have one end threadably engaged with the crankcase half 14, their mid-portions being disposed in the bore 62 of the muff and their outer ends extending through the cylinder head 20 for engagement with a nut 74. Thus, the cylinder barrel assembly 18 is removably clamped between the crankcase section 14 and the head 20.

The preferred muff 44 has fins arranged to produce an optimum air turbulence to provide an effective cooling means for a high speed engine. The bosses 60, in addition to providing means for clamping the cylinder barrel assembly in place, cause the cooling air to assume a state of turbulence thereby improving the cooling characteristics of the muff. The cast iron sleeve construction provides a longer life than conventional steel liners. In addition, the cylinder barrel assembly can be easily replaced by removing the cylinder head and then installing a new cylinder barrel assembly and replacing the cylinder head. This is an improvement over conventional practice wherein both the cylinder head and cylinder barrel assembly are replaced.

The improved gasket provided between the mating surfaces of the cylinder head and the cylinder barrel assembly by providing an effective seal permits a construction wherein the barrel assembly can be bolted to the cylinder head in the manner herein disclosed.

Having thus described our invention, we claim:

1. In an air cooled, internal combustion engine, the combination comprising:
   a crankcase having a mounting surface and a circular bore opening to said mounting surface;
   a cylinder barrel assembly including a cast iron cylindrical sleeve having one end received by said circular bore and an opposite end adapted to extend into a cylinder head to form a combustion chamber, and an aluminum finned muff encompassing said sleeve and joined thereto, said muff having a flanged section at one end with a flat surface removably engaged with the mounting surface of said crankcase, and a head mounting surface opposite to said flat surface, said head mounting surface being spaced inwardly from the adjacent end of said sleeve and having an annular recess formed around said sleeve with a predetermined depth, said recess being rectangular in transverse cross section having opposite side surfaces and a bottom surface, said muff having axial sections with a greater fin area than other axial sections, and said muff having a plurality of a circumferentially spaced radially projecting bosses with axial bores for receiving through bolts;
   a cylinder head having a flat surface engaging the head mounting surface of said cylinder barrel assembly;
   a compressible annular gasket formed of resilient material disposed in said annular recess, said gasket having an uncompressed thickness greater than the predetermined depth of said recess so that said gasket forms a sealed engagement between said cylinder barrel assembly and said cylinder head, said gasket being V-shaped in section and being disposed in said recess with one of the legs forming the V engaging the bottom surface forming the recess and the other leg engaging said cylinder head surface so that compression of said gasket causes said legs to be moved one toward the other, said legs also having portions engaging said opposite surfaces so that as said cylinder barrel assembly and said cylinder head are engaged said gasket is engaged with each surface of said recess and as well as with said cylinder head; and a series of through bolts each having a first end section connected to said crankcase, intermediate sections disposed in the bores of the bosses of said muff and upper ends releasably fastened to said cylinder head so that said cylinder barrel is removably clamped between said crankcase and said cylinder head.

2. The combination as defined in claim 1, wherein said cylinder barrel assembly and said cylinder head cooperate to form a combustion chamber having an intake side for the reception of combustible materials and an exhaust side for the discharge of combustion products and wherein the side of said muff associated with said exhaust side of said combustion chamber has a greater number of fins than the side of the said muff associated with said intake side.

3. In an air cooled, internal combustion engine, the combination comprising:

a crankcase having a mounting surface and a bore opening to said mounting surface;

a cylinder barrel assembly including a sleeve having one end received by said bore and an opposite end adapted to extend into a cylinder head to form a combustion chamber, and a muff encompassing said sleeve and joined thereto, said muff having a flat surface removably engaged with the mounting surface of said crankcase, and a head mounting surface opposite to said flat surface, said head mounting surface having a recess formed around said sleeve with a predetermined depth, said recess having opposite side surfaces and a bottom surface;

a cylinder head having a flat surface engaging the head mounting surface of said cylinder barrel assembly;

a compressible gasket formed of resilient material disposed in said recess, said gasket having an uncompressed thickness greater than the predetermined depth of said recess so that said gasket forms a sealed engagement between said cylinder barrel assembly and said cylinder head, said gasket being V-shaped in section and being disposed in said recess with one of the legs forming the V engaging the bottom surface forming the recess and the other leg engaging said cylinder head surface so that compression of said gasket causes said legs to be moved one toward the other, said legs also having portions engaging said opposite surfaces so that as said cylinder barrel assembly and said cylinder head are engaged said gasket is engaged with each surface of said recess and as well as with said cylinder head; and means for releasably fastening said cylinder head to said cylinder barrel assembly.

4. The combination as defined in claim 3, wherein said cylinder barrel comprises a cylindrical cast iron sleeve and an aluminum externally finned muff encompassing said sleeve and joined thereto.

5. The combination as defined in claim 3, wherein said cylinder barrel has an externally finned section with a series of axially spaced fins each having a base formed on a common radius and peaks of successive fins having a progressively reduced radius.

6. The combination as defined in claim 5, wherein the radius of the peak of individual fins of said series on one side of said finned section varies from the radius of the peak of the corresponding fins on a second side of said fin sections.

7. The combination as defined in claim 5, wherein one side of said finned section has a greater number of fins than a second side of said finned section.

8. The combination as defined in claim 3, wherein said muff is provided with external fins, one said muff having a flanged portion providing a seat for said cylinder barrel on said mounting surface of said crankcase.

9. The combination as defined in claim 3, wherein the axial half of said muff adjacent said cylinder head has a greater number of fins than the axial half of said muff adjacent said crankcase.

References Cited

UNITED STATES PATENTS

| 1,472,068 | 10/1923 | Harley | 123—41.69 X |
| 2,227,933 | 1/1941 | Hersey | 123—41.69 |
| 2,340,566 | 2/1944 | Ryder | 123—41.69 X |
| 2,380,163 | 7/1945 | Goby | 123—195 X |
| 2,456,272 | 12/1948 | Gregory. | |
| 2,553,222 | 5/1951 | Wallgren et al. | |
| 2,968,293 | 1/1961 | Kolbe | 123—41.69 |
| 3,114,561 | 12/1963 | Creath et al. | 277—205 X |
| 3,165,094 | 1/1965 | Lechtenberg | 123—41.69 |
| 3,184,246 | 5/1965 | Kline | 277—206 X |

FOREIGN PATENTS 937,200  9/1963  Great Britain.

AL LAWRENCE SMITH, Primary Examiner

U.S. Cl. X.R.

123—193; 92—171; 277—205, 211